United States Patent
Kim et al.

(10) Patent No.: US 11,279,414 B2
(45) Date of Patent: Mar. 22, 2022

(54) CENTER PILLAR FOR VEHICLE

(71) Applicants: Hyundai Motor Company, Seoul (KR); Kia Motors Corporation, Seoul (KR); SUNG WOO HITECH CO., LTD., Busan (KR)

(72) Inventors: Min Soo Kim, Gyeonggi-do (KR); Jeong Min Cho, Gyeonggi-do (KR); Seung Uk Kang, Gyeonggi-do (KR); Seung Hyun Baek, Gyeonggi-do (KR); Chi Hoon Choi, Gyeonggi-do (KR); Min Gwan Bae, Busan (KR); Sung Goo Kim, Busan (KR)

(73) Assignees: Hyundai Motor Company, Seoul (KR); Kia Motors Corporation, Seoul (KR); Sung Woo Hitech Co., Ltd., Busan (KR)

( * ) Notice: Subject to any disclaimer, the term of this patent is extended or adjusted under 35 U.S.C. 154(b) by 95 days.

(21) Appl. No.: 16/686,537

(22) Filed: Nov. 18, 2019

(65) Prior Publication Data

US 2020/0369322 A1    Nov. 26, 2020

(30) Foreign Application Priority Data

May 21, 2019    (KR) ........................ 10-2019-0059267

(51) Int. Cl.
    *B62D 25/04*      (2006.01)
    *B62D 29/04*      (2006.01)

(52) U.S. Cl.
    CPC ........... *B62D 25/04* (2013.01); *B62D 29/043* (2013.01); *B32B 2250/42* (2013.01)

(58) Field of Classification Search
    CPC .......................... B62D 25/04; B32B 2250/42
    USPC ..................................................... 296/193.06
    See application file for complete search history.

(56) References Cited

U.S. PATENT DOCUMENTS

| | | | |
|---|---|---|---|
| 6,361,032 B1 | 3/2002 | Lawson | |
| 2011/0052910 A1* | 3/2011 | Gunnink | B32B 5/26 |
| | | | 428/337 |
| 2014/0234600 A1* | 8/2014 | Wang | B32B 5/12 |
| | | | 428/212 |

(Continued)

FOREIGN PATENT DOCUMENTS

| | | | | |
|---|---|---|---|---|
| JP | 2005-225364 | * | 8/2005 | ............ B60R 21/02 |
| KR | 20190004440 A | | 1/2019 | |
| WO | 2012/107240 A1 | | 8/2012 | |

*Primary Examiner* — Dennis H Pedder
(74) *Attorney, Agent, or Firm* — Mintz Levin Cohn Ferris Glovsky and Popeo, P.C.; Peter F. Corless

(57) ABSTRACT

A center pillar for a vehicle is provided and includes carbon-fiber-reinforced plastic (CFRP) and glass-fiber-reinforced plastic (GFRP) that are alternately laminated to reduce the weight of the center pillar and maintain the strength of the center pillar. The center pillar includes a base layer that is formed of CFRP; and laminate layers in which a plurality of layers of CFRP and a plurality of layers of GFRP are alternately disposed on a first surface and a second surface of the base layer individually. Accordingly, the CFRP and the GFRP laminated on the first surface of the base layer and the CFRP and the GFRP laminated on the second surface of the base layer are symmetrical to each other with respect to a thickness direction of the center pillar.

8 Claims, 12 Drawing Sheets

(56) References Cited

U.S. PATENT DOCUMENTS

2018/0118279 A1    5/2018  Lee et al.
2019/0248107 A1*   8/2019  Hatanaka ................ B29C 70/28

\* cited by examiner

FIG. 5

| Category | | Top region | Third transition region | Second transition region | First transition region | Bottom region | Thickness |
|---|---|---|---|---|---|---|---|
| Laminate layer | 1-4 zone | GFRP | GFRP | | | | 0.5 |
| | | 0 | 0 | | | | 0.16 |
| | | -15 | -15 | | | | 0.16 |
| | | 15 | 15 | GFRP | | | 0.16/0.5 |
| | 1-3 zone | 0 | 0 | 0 | | | 0.16 |
| | | 0 | 0 | 0 | GFRP | | 0.16/0.5 |
| | 1-2 zone | 0 | 0 | 0 | 0 | | 0.16 |
| | | -15 | -15 | -15 | -15 | | 0.16 |
| | | 15 | 15 | 15 | 15 | GFRP | 0.16/0.5 |
| | 1-1 zone | GFRP | GFRP | GFRP | GFRP | GFRP | 0.5 |
| | | -15 | -15 | -15 | -15 | -15 | 0.16 |
| | | 15 | 15 | 15 | 15 | 15 | 0.16 |
| Base layer | | 0 | 0 | 0 | 0 | 0 | 0.16 |
| Laminate layer | 1-1 zone | 15 | 15 | 15 | 15 | 15 | 0.16 |
| | | -15 | -15 | -15 | -15 | -15 | 0.16 |
| | | GFRP | GFRP | GFRP | GFRP | GFRP | 0.5 |
| | 1-2 zone | 15 | 15 | 15 | 15 | GFRP | 0.16/0.5 |
| | | -15 | -15 | -15 | -15 | | 0.16 |
| | | 0 | 0 | 0 | 0 | | 0.16 |
| | 1-3 zone | 0 | 0 | 0 | GFRP | | 0.16/0.5 |
| | | 0 | 0 | 0 | | | 0.16 |
| | 1-4 zone | 15 | 15 | GFRP | | | 0.16/0.5 |
| | | -15 | -15 | | | | 0.16 |
| | | 0 | 0 | | | | 0.16 |
| | | GFRP | GFRP | | | | 0.5 |

FIG. 6

| Category | | Top region | Third transition region | Second transition region | First transition region | Bottom region | Thickness |
|---|---|---|---|---|---|---|---|
| Laminate layer | 1-4 zone | GFRP | GFRP | GFRP | GFRP | GFRP | 0.5 |
| | | 0 | 0 | 0 | 0 | 0 | 0.16 |
| | | -15 | -15 | -15 | -15 | -15 | 0.16 |
| | | 15 | 15 | 15 | 15 | 15 | 0.16 |
| | 1-3 zone | 0 | 0 | 0 | 0 | 0 | 0.16 |
| | | 0 | 0 | 0 | 0 | 0 | 0.16 |
| | 1-2 zone | 0 | 0 | 0 | 0 | 0 | 0.16 |
| | | -15 | -15 | -15 | -15 | -15 | 0.16 |
| | | 15 | 15 | 15 | 15 | 15 | 0.16 |
| | 1-1 zone | GFRP | GFRP | GFRP | GFRP | GFRP | 0.5 |
| | | -15 | -15 | -15 | -15 | -15 | 0.16 |
| | | 15 | 15 | 15 | 15 | 15 | 0.16 |
| Base layer | | 0 | 0 | 0 | 0 | 0 | 0.16 |
| Laminate layer | 1-1 zone | 15 | 15 | 15 | 15 | 15 | 0.16 |
| | | -15 | -15 | -15 | -15 | -15 | 0.16 |
| | | GFRP | GFRP | GFRP | GFRP | GFRP | 0.5 |
| | 1-2 zone | 15 | 15 | 15 | 15 | 15 | 0.16 |
| | | -15 | -15 | -15 | -15 | -15 | 0.16 |
| | | 0 | 0 | 0 | 0 | 0 | 0.16 |
| | 1-3 zone | 0 | 0 | 0 | 0 | 0 | 0.16 |
| | | 0 | 0 | 0 | 0 | 0 | 0.16 |
| | 1-4 zone | 15 | 15 | 15 | 15 | 15 | 0.16 |
| | | -15 | -15 | -15 | -15 | -15 | 0.16 |
| | | 0 | 0 | 0 | 0 | 0 | 0.16 |
| | | GFRP | GFRP | GFRP | GFRP | GFRP | 0.5 |

FIG. 7

| Category | | Top region | transition region | Bottom region | Thickness |
|---|---|---|---|---|---|
| Laminate layer | 2-3 zone | 15 | | | 0.16 |
| | | 15 | | | 0.16 |
| | | -15 | | | 0.16 |
| | | -15 | | | 0.16 |
| | 2-2 zone | 15 | 15 | | 0.16 |
| | | 15 | 15 | | 0.16 |
| | | -15 | -15 | | 0.16 |
| | | -15 | -15 | | 0.16 |
| | 2-1 zone | GFRP | GFRP | GFRP | 0.5 |
| | | 0 | 0 | 0 | 0.16 |
| | | 0 | 0 | 0 | 0.16 |
| | | GFRP | GFRP | GFRP | 0.5 |
| Base layer | | 0 | 0 | 0 | 0.16 |
| Laminate layer | 2-1 zone | GFRP | GFRP | GFRP | 0.5 |
| | | 0 | 0 | 0 | 0.16 |
| | | 0 | 0 | 0 | 0.16 |
| | | GFRP | GFRP | GFRP | 0.5 |
| | 2-2 zone | -15 | -15 | | 0.16 |
| | | -15 | -15 | | 0.16 |
| | | 15 | 15 | | 0.16 |
| | | 15 | 15 | | 0.16 |
| | 2-3 zone | -15 | | | 0.16 |
| | | -15 | | | 0.16 |
| | | 15 | | | 0.16 |
| | | 15 | | | 0.16 |

FIG. 8

| Category | | Top region | transition region | Bottom region | Thickness |
|---|---|---|---|---|---|
| Laminate layer | 2-3 zone | 15 | 15 | 15 | 0.16 |
| | | 15 | 15 | 15 | 0.16 |
| | | -15 | -15 | -15 | 0.16 |
| | | -15 | -15 | -15 | 0.16 |
| | 2-2 zone | 15 | 15 | 15 | 0.16 |
| | | 15 | 15 | 15 | 0.16 |
| | | -15 | -15 | -15 | 0.16 |
| | | -15 | -15 | -15 | 0.16 |
| | 2-1 zone | GFRP | GFRP | GFRP | 0.5 |
| | | 0 | 0 | 0 | 0.16 |
| | | 0 | 0 | 0 | 0.16 |
| | | GFRP | GFRP | GFRP | 0.5 |
| Base layer | | 0 | 0 | 0 | 0.16 |
| Laminate layer | 2-1 zone | GFRP | GFRP | GFRP | 0.5 |
| | | 0 | 0 | 0 | 0.16 |
| | | 0 | 0 | 0 | 0.16 |
| | | GFRP | GFRP | GFRP | 0.5 |
| | 2-2 zone | -15 | -15 | -15 | 0.16 |
| | | -15 | -15 | -15 | 0.16 |
| | | 15 | 15 | 15 | 0.16 |
| | | 15 | 15 | 15 | 0.16 |
| | 2-3 zone | -15 | -15 | -15 | 0.16 |
| | | -15 | -15 | -15 | 0.16 |
| | | 15 | 15 | 15 | 0.16 |
| | | 15 | 15 | 15 | 0.16 |

CENTER PILLAR FOR VEHICLE

CROSS REFERENCE TO RELATED APPLICATION

The present application claims priority to Korean Patent Application No. 10-2019-0059267, filed May 21, 2019, the entire content of which is incorporated herein for all purposes by this reference.

BACKGROUND

Field of the Invention

The present invention relates to a center pillar for a vehicle, and more particularly, to a center pillar for a vehicle with carbon-fiber-reinforced plastic and glass-fiber-reinforced plastic are alternately laminated to reduce the weight of the center pillar and maintain the strength of the center pillar in consideration of roof strength and ability to withstand a side collision.

Description of the Related Art

Pillars are parts of a vehicle frame and support the roof. The pillars include a front pillar, a center pillar, and a rear pillar, sequentially from the front of the vehicle. The front pillar, the center pillar, and the rear pillar are also referred to as an A-pillar, a B-pillar, and a C-pillar, respectively.

The center pillar is an important structural element that supports the roof of the vehicle and absorbs the energy of impact of a side collision and prevents the other vehicle of the collision from entering the passenger compartment. In addition, the center pillar is a structural component of a vehicle for attaching door hinges and for attaching seat belts. The center pillar is composed of several elements, most of which are reinforcing materials. To minimize the deformation of a vehicle, high-tensile-strength steel sheets are used as the reinforcing sheets. In general, the center pillar is prepared by press-forming a high-tensile-strength steel sheet and attaching a reinforcing sheet to the press-formed steel sheet through spot welding.

Accordingly, a thick high-tensile-strength steel sheet is applied to increase the strength of the center pillar. The thick high-tensile-strength steel sheet is strong, leading to a decrease in ductility and an increase in brittleness. Thus, the thick high-tensile-strength steel sheet may be broken by an impact during a collision.

In recent years, to reduce weight of vehicles to improve the fuel efficiency thereof, research has been conducted with the goal of applying a fiber-reinforced plastic to the center pillar made of a high-tensile-strength steel sheet, wherein the fiber-reinforced plastic is light in weight and ensures the strength of the center pillar. For example, a technique has been developed in which a portion of the center pillar is made of carbon-fiber-reinforced plastic (CFRP) instead of a high-tensile-strength steel sheet, and a steel material and the CFRP are bonded together. However, it is difficult to bond the steel material and the CFRP according to the technique, and an additional fastening component is required for mechanical coupling.

Alternatively, a technique has been developed in which the entire portion of the center pillar is made of CFRP instead of a high-tensile-strength steel sheet. However, when forming the center pillar only with CFRP, manufacturing costs are increased. In addition, the use of carbon fiber, which is conductive, causes bimetallic corrosion to occur.

The foregoing is intended merely to aid in the understanding of the background of the present invention, and is not intended to mean that the present invention falls within the purview of the related art that is already known to those skilled in the art.

SUMMARY

The present invention provides a center pillar for a vehicle, the center pillar being configured such that carbon-fiber-reinforced plastic (CFRP) and glass-fiber-reinforced plastic (GFRP) are alternately laminated, thereby reducing the weight of the center pillar, maintaining the strength of the center pillar in consideration of roof strength and ability to withstand a side collision, and minimizing an increase in material costs.

In order to achieve the above objective, a center pillar for a vehicle may include: a base layer formed of carbon-fiber-reinforced plastic (CFRP); and laminate layers in which a plurality of layers of CFRP and a plurality of layers of glass-fiber-reinforced plastic (GFRP) are alternately disposed on a first surface and a second surface of the base layer individually in a manner such that the CFRP and the GFRP laminated on the first surface of the base layer and the CFRP and the GFRP laminated on the second surface of the base layer are symmetrical to each other with respect to a thickness direction of the center pillar. The second surface being opposite to the first surface.

The base layer may be formed of CFRP in which carbon fibers have an orientation of 0° with respect to a longitudinal direction of the center pillar. A plurality of layers of CFRP forming the laminate layers may be configured such that carbon fibers have an orientation of 0° or ±15° with respect to a longitudinal direction of the center pillar. A plurality of layers of GFRP forming the laminate layers may be a plain weave fabric or a twill weave fabric in which glass fibers are woven at 0° and 90° with respect to a longitudinal direction of the center pillar.

The center pillar may be divided into a bottom region, a first transition region, a second transition region, a third transition region, and a top region with respect to a longitudinal direction of the center pillar from a bottom to a top thereof. The bottom region may be provided with a 1-1 zone in which CFRP in which carbon fibers have an orientation of ±15° and GFRP formed into a plain weave fabric or a twill weave fabric in which glass fibers are woven at 0° and 90° are sequentially laminated on opposite surfaces of the base layer. The first transition region may be provided with the 1-1 zone and a 1-2 zone in which CFRP in which carbon fibers have an orientation of ±15°, CFRP in which carbon fibers have an orientation of 0°, and GFRP formed into a plain weave fabric or a twill weave fabric in which glass fibers are woven at 0° and 90° are sequentially laminated on the 1-1 zone.

The second transition region may be provided with the 1-1 zone, the 1-2 zone, and a 1-3 zone in which CFRP in which carbon fibers have an orientation of 0° and GFRP formed into a plain weave fabric or a twill weave fabric in which glass fibers are woven at 0° and 90° are sequentially laminated on the 1-2 zone. Each of the third transition region may be provided with the 1-1 zone, the 1-2 zone, the 1-3 zone, and a 1-4 zone in which CFRP in which carbon fibers have an orientation of ±15°, CFRP in which carbon fibers have an orientation of 0°, and GFRP formed into a plain weave fabric or a twill weave fabric in which glass fibers are woven at 0° and 90° are sequentially laminated on the 1-3 zone.

The center pillar may be configured such that all of the 1-1 zone, the 1-2 zone, the 1-3 zone, and the 1-4 zone are provided on the bottom region, the first transition region, the second transition region, the third transition region, and the top region. The center pillar may be divided into a bottom region, a transition region, and a top region with respect to a longitudinal direction of the center pillar from a bottom to a top thereof. The bottom region may be provided with a 2-1 zone in which GFRP formed into a plain weave fabric or a twill weave fabric in which glass fibers are woven at 0° and 90°, CFRP in which carbon fibers have an orientation of 0°, and GFRP formed into a plain weave fabric or a twill weave fabric in which glass fibers are woven at 0° and 90° are sequentially laminated on opposite surfaces of a base layer.

The transition region may be provided with the 2-1 zone and a 2-2 zone in which CFRP in which carbon fibers have an orientation of ±15° are laminated on the 2-1 zone. The top region may be provided with the 2-1 zone, the 2-2 zone, and a 2-3 zone in which CFRP in which carbon fibers have an orientation of ±15° are laminated on the 2-2 zone. The center pillar may be configured such that all of the 2-1 zone, the 2-2 zone, and the 2-3 zone are provided on the bottom region, the transition region, and the top region. The CFRP may be about 0.16 mm thick, and the GFRP may be about 0.5 mm thick.

According to the exemplary embodiment of the present invention, CFRP and GFRP, which is inexpensive compared to CFRP, may be laminated alternately to prepare a center pillar for a vehicle, whereby it may be possible to expect to a reduction in weight, an improvement in strength, and a reduction in material costs. In addition, since the GFRP, which is non-conductive, and CFRP may be laminated alternately to prevent bimetallic corrosion of the center pillar.

BRIEF DESCRIPTION OF THE DRAWINGS

The above and other objects, features and other advantages of the present invention will be more clearly understood from the following detailed description when taken in conjunction with the accompanying drawings, in which:

FIGS. 5 to 8 are tables listing types, orientations, and thicknesses of reinforced fibers for each region, the reinforced fibers constituting the center pillar according to various exemplary embodiments of the present invention;

DETAILED DESCRIPTION

Figure 1:
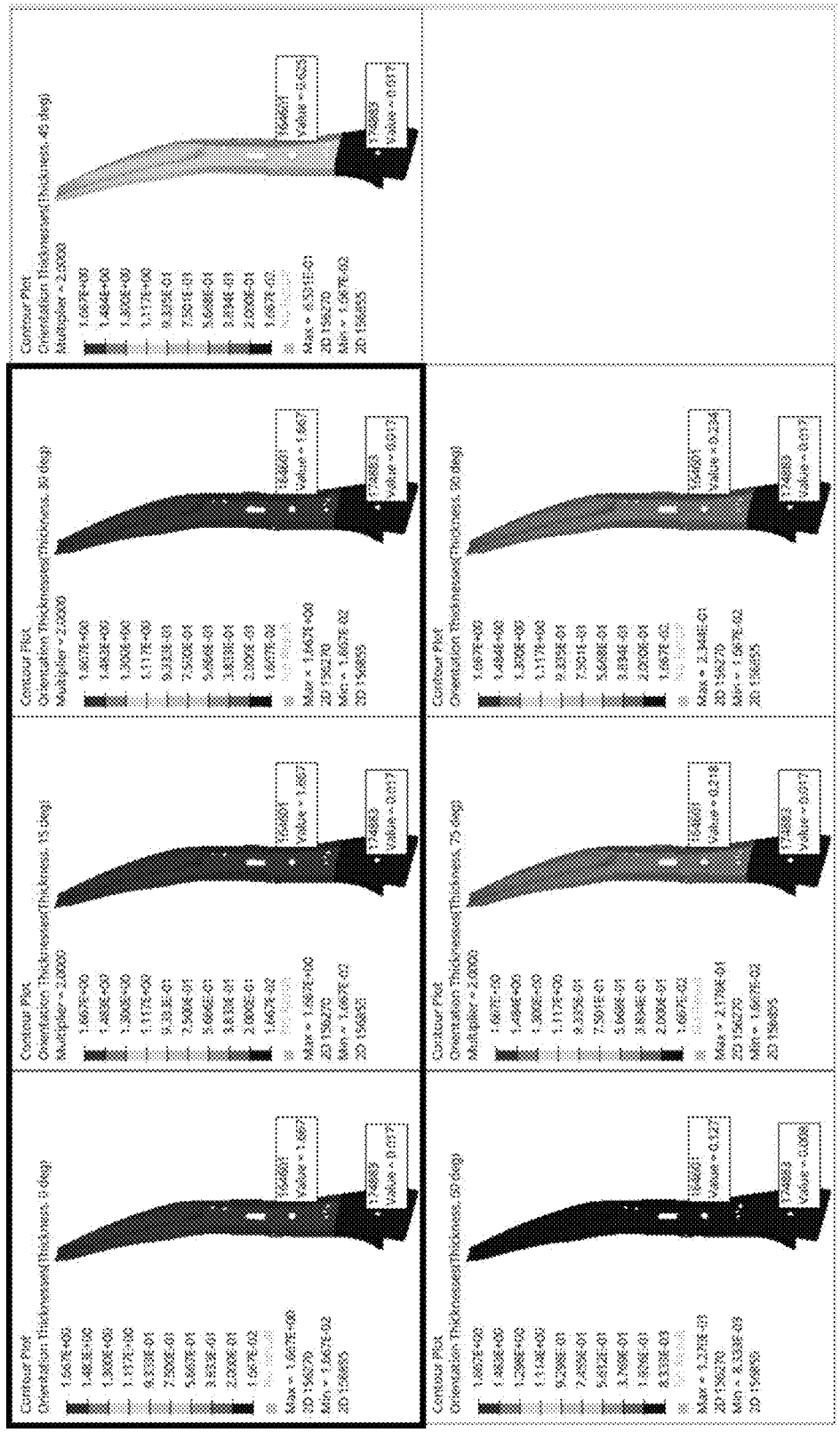
FIG. 1 is an image illustrating the result of an experiment on roof strength based on the orientation in which reinforced fibers are arranged.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinbelow, embodiments of the present invention will be described in detail with reference to the accompanying drawings. However, it will be understood that the present description is not intended to limit the invention to those exemplary embodiments. On the contrary, the invention is intended to cover not only the exemplary embodiments, but also various alternatives, modifications, equivalents, and other embodiments that may be included within the spirit and scope of the invention as defined by the appended claims. Throughout the drawings, the same reference numerals will refer to the same or like parts.

In order to determine an orientation in which carbon fibers are arranged (hereinafter, referred to as the orientation of the carbon fibers) that is able to be applied to the present invention, among various orientations of carbon fibers, an experiment on roof strength based on the orientation of the carbon fibers was conducted, and the optimum orientation of the carbon fibers was derived.

FIG. 1 is an image illustrating the result of an experiment on roof strength based on the orientation of the carbon fibers. As illustrated in FIG. 1, a simulation program was used to derive the thickness of the center pillar that ensures the roof strength required for the center pillar for a vehicle. The orientations of the carbon fibers were set to 0°, 15°, 30°, 45°, 60°, 75°, and 90°, and the result is illustrated in FIG. 1. As a result, it was confirmed that feasible thicknesses were distributed within a range of orientations of the carbon fibers of 0°, 15°, and 30° and thus, a desired level of roof strength may be obtained within the range. An experiment related to thickness distribution based on the orientations of the carbon fibers was also conducted, and the optimum orientation of the carbon fibers was derived.

Figure 2:
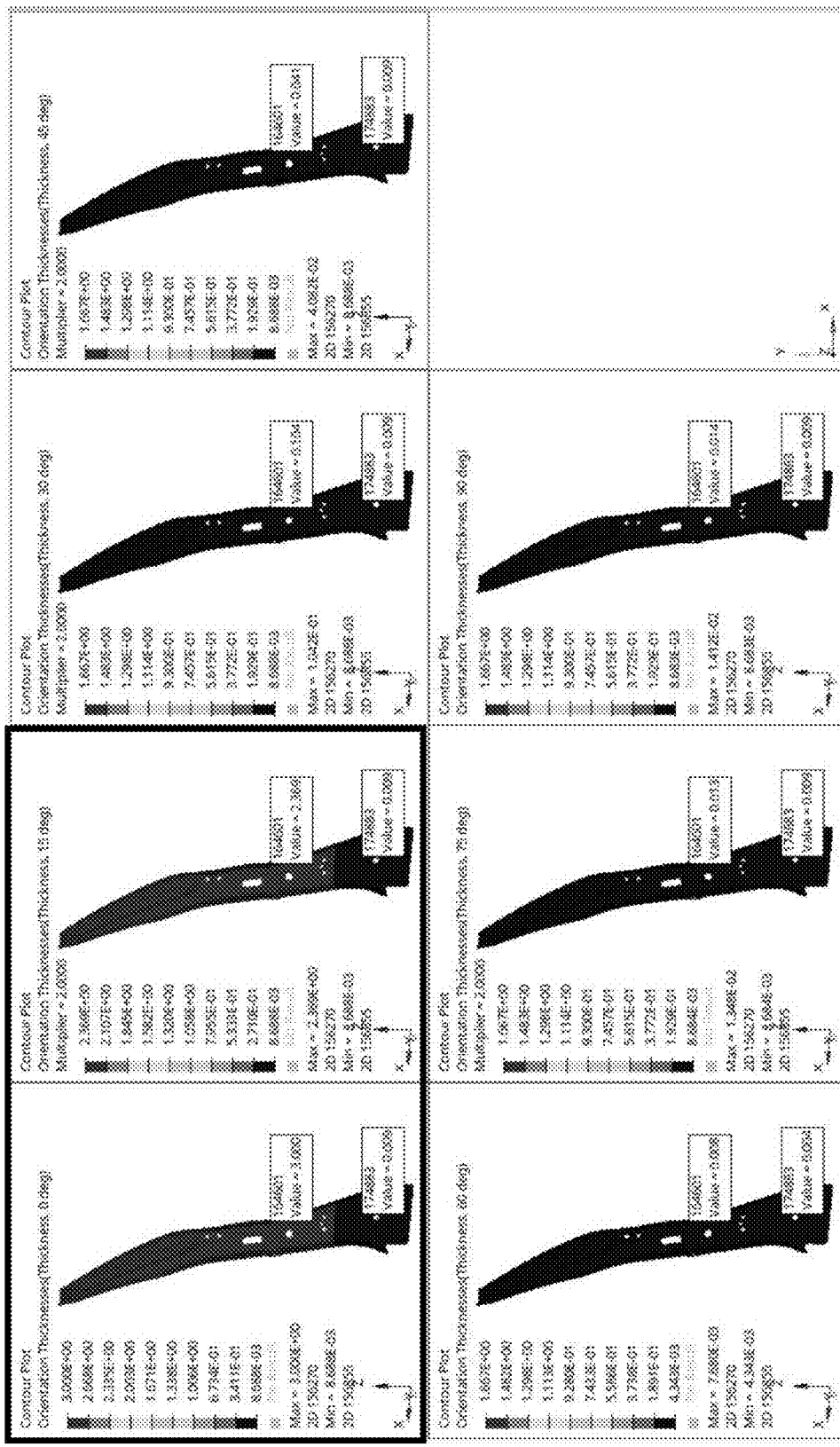
FIG. 2 is an image illustrating the result of an experiment on thickness distribution based on the orientation in which reinforced fibers are arranged.

FIG. 2 is an image illustrating the result of the experiment related to thickness distribution based on the orientation of the carbon fibers. As illustrated in FIG. 2, a simulation program was used to derive the thickness distribution based on the orientation of the carbon fibers for ensuring the roof strength required for the center pillar for a vehicle. The orientations of the carbon fibers were set to 0°, 15°, 30°, 45°, 60°, 75°, and 90°, and the result is illustrated in FIG. 2. As a result, it was confirmed that feasible thicknesses were distributed within a range of orientations of the carbon fibers of 0° and 15°, and thus, a desired level of roof strength may be obtained within the range.

When forming the center pillar according to the results illustrated in FIGS. 1 and 2, it was confirmed that it is advantageous to use fiber-reinforced plastic containing carbon fibers having an orientation of 0° or ±15°. It was confirmed that it is advantageous to form fiber-reinforced plastic containing carbon fibers having an orientation of 0° to be about 1.6 mm to 3.0 mm thick and to form fiber-reinforced plastic containing carbon fibers having an orientation of 15° to be about 1.6 mm to 2.4 mm thick.

Hereinafter, unless otherwise stated, the angle indicating the orientation of the fibers is based on the longitudinal direction of the center pillar. In particular, that the orientation of the fibers is 0° refers to that the orientation of the fibers is parallel to the longitudinal direction of the center pillar. Various exemplary embodiments in which the center pillar is implemented by applying the orientations of the carbon fibers derived from the above will be described.

Figure 3:
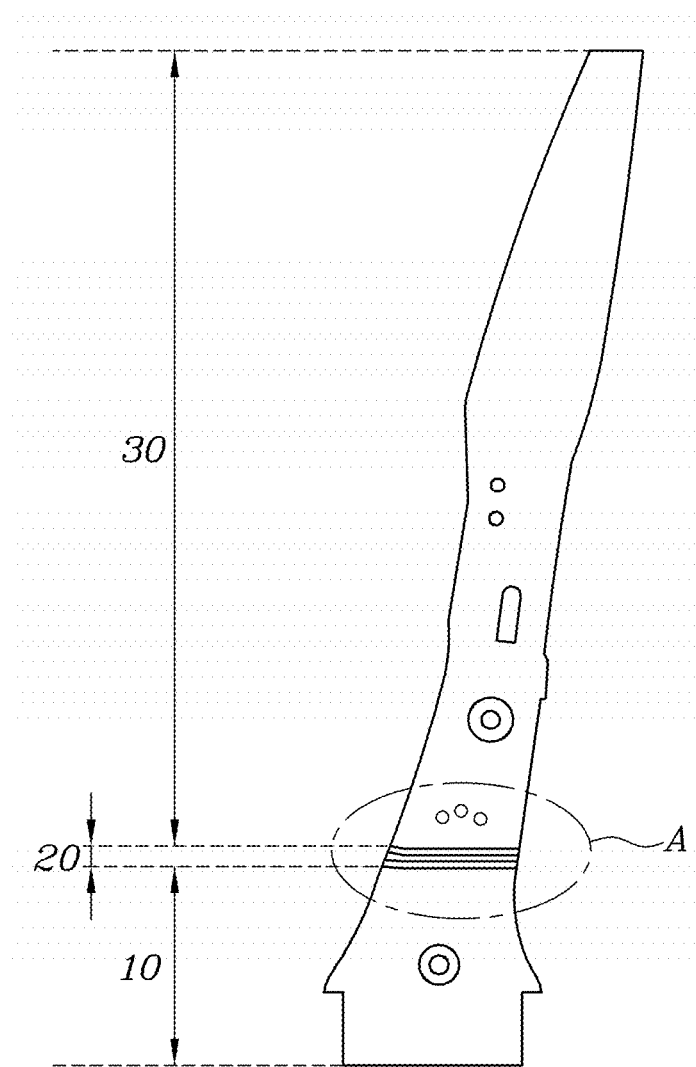
FIG. 3 is a view illustrating a center pillar for a vehicle according to an exemplary embodiment of the present invention.
Figure 4:
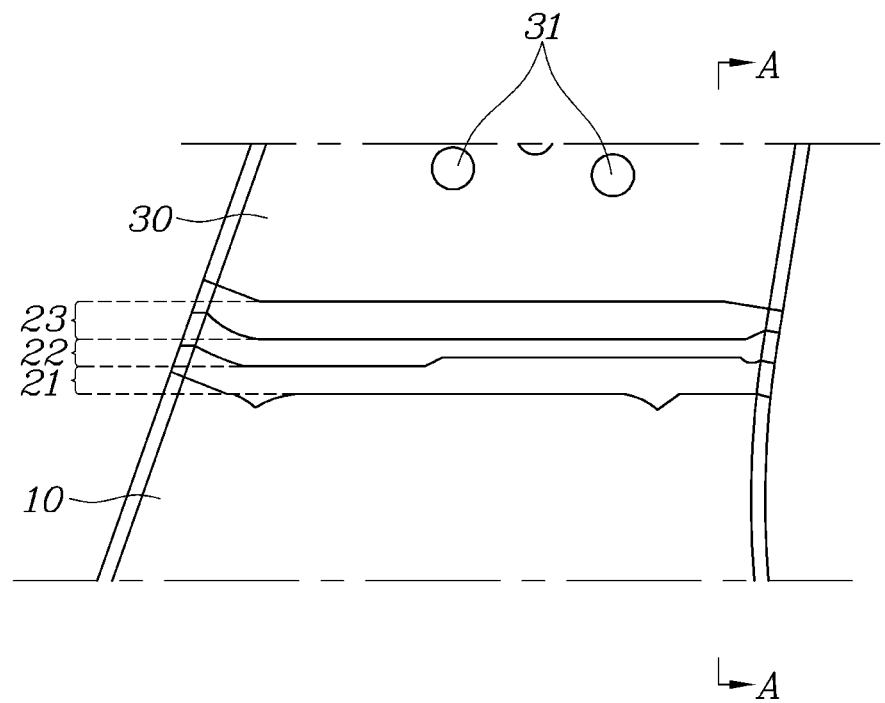
FIG. 4 is an enlarged view illustrating region A of FIG. 3 according to an exemplary embodiment of the present invention.

FIG. 3 is a view illustrating the center pillar for a vehicle according to an exemplary embodiment of the present invention; and FIG. 4 is an enlarged view illustrating region A of FIG. 3. As illustrated in the drawings, the center pillar for a vehicle according to the exemplary embodiment of the present invention may include: a base layer formed of carbon-fiber-reinforced plastic (CFRP); and laminate layers in which a plurality of layers of CFRP and a plurality of layers of glass-fiber-reinforced plastic (GFRP) may be alternately disposed on a first surface and a second surface (e.g., a surface opposite to the first surface) of the base layer individually and thus, the CFRP and the GFRP laminated on the first surface of the base layer and the CFRP and the GFRP laminated on the second surface of the base layer may be symmetrical to each other with respect to the thickness direction of the center pillar.

In the present invention, according to the optimum orientation derived above, CFRP is used, in which the carbon fibers have an orientation of 0° or ±15°. Particularly, the CFRP may be formed into a sheet form and laminated, wherein the thickness thereof is about 0.16 mm in the exemplary embodiment. Likewise, the GFRP is formed into a sheet form and laminated, wherein the GFRP may be a plain weave fabric or a twill weave fabric in which glass fibers are woven at 0° and 90°. In this case, sheet-formed GFRP with a thickness of about 0.5 mm may be used. Since the glass fibers of the GFRP are woven at 0° and 90°, each of the layers of glass fiber woven at 0° and 90° occupies the thickness of about 2.5 mm.

In particular, it is advantageous that the base layer be formed of CFRP in which carbon fibers have an orientation of 0°. The laminate layers disposed on the first surface and the second surface of the base layer in a symmetrical manner may be formed by alternately laminating the CFRP in which the carbon fibers have an orientation of 0° or ±15° and the GFRP formed into a plain weave fabric or a twill weave fabric in which the glass fibers are woven at 0° and 90°. Therefore, for each of the laminate layers, an odd number of layer or layers of CFRP in which the carbon fibers have the orientation of 0° are provided, and an even number of layers of CFRP in which the carbon fibers have the orientation of ±15° and an even number of layers of GFRP formed into a plain weave fabric or a twill weave fabric in which the glass fibers are woven at 0° and 90° are provided.

It has been described above with reference to FIGS. 1 and 2 that it is advantageous to form the fiber-reinforced plastic containing the carbon fibers having the orientation of 0° to be about 1.6 mm to 3.0 mm thick and to form the fiber-reinforced plastic containing the carbon fibers having the orientation of 15° to be about 1.6 mm to 2.4 mm thick. However, it is also advantageous to form the fiber-reinforced plastic containing the carbon fibers having the orientation of 0° to be a total of about 1.44 mm to 3.04 mm thick and to form the fiber-reinforced plastic containing the carbon fibers having the orientation of 15° to be a total thickness of about 1.6 mm to 2.56 mm.

Various exemplary embodiments for implementing the center pillar for a vehicle according to the present invention will be described. As illustrated in FIGS. 3 and 4, the center pillar may be divided into a bottom region 10, a transition region 20, and a top region 30 with respect to the longitudinal direction from the bottom to the top. In particular, the transition region 20 may be subdivided into a first transition region 21, a second transition region 22, and a third transition region 23 with respect to the longitudinal direction from the bottom to the top. The center pillar may include lower hinge apertures 31 in which a lower hinge of a rear door is mounted. The transition region 20 may be disposed below the lower hinge apertures 31.

Therefore, the base layer may be provided in the bottom region 10, the first transition region 21, the second transition region 22, the third transition region 23, and the top region 30. Then, a lamination pattern of the CFRP and the GFRP laminated to the base layer varies for each of the bottom region 10, the first transition region 21, the second transition region 22, the third transition region 23, and the top region 30 and thus, the strength thereof may be maintained while minimizing the weight thereof. In addition, the bottom region 10 may be provided with a 1-1 zone in which CFRP in which carbon fibers have an orientation of ±15° and GFRP formed into a plain weave fabric or a twill weave fabric in which glass fibers are woven at 0° and 90° are sequentially laminated on opposite surfaces of the base layer.

The first transition region 21 may be provided with the 1-1 zone and a 1-2 zone in which CFRP in which carbon fibers have an orientation of ±15°, CFRP in which carbon fibers have an orientation of 0°, and GFRP formed into a plain weave fabric or a twill weave fabric in which glass fibers are woven at 0° and 90° are sequentially laminated on the 1-1 zone. Additionally, the second transition region 22 may be provided with the 1-1 zone, the 1-2 zone, and a 1-3 zone in which CFRP in which carbon fibers have an orientation of 0° and GFRP formed into a plain weave fabric or a twill weave fabric in which glass fibers are woven at 0° and 90° are sequentially laminated on the 1-2 zone.

Each of the third transition region 23 and the top region 30 may be provided with the 1-1 zone, the 1-2 zone, the 1-3 zone, and a 1-4 zone in which CFRP in which carbon fibers have an orientation of ±15°, CFRP in which carbon fibers have an orientation of 0°, and GFRP formed into a plain weave fabric or a twill weave fabric in which glass fibers are woven at 0° and 90° are sequentially laminated on the 1-3 zone. In particular, the CFRP and the GFRP forming the 1-1 zone provided in the bottom region 10, the first transition region 21, the second transition region 22, the third transition region 23, and the top region 30 may be extended over the regions.

The CFRP and the GFRP forming the 1-2 zone provided in the first transition region 21, the second transition region 22, the third transition region 23, and the top region 30 may be extended over the regions. In addition, the CFRP and the GFRP forming the 1-3 zone provided in the second transition region 22, the third transition region 23, and the top region 30 may be extended over the regions. Therefore, as illustrated in FIG. 5, the thickness of the center pillar may gradually increase in the order of the bottom region 10, the first transition region 21, the second transition region 22, the third transition region 23, and the top region 30.

Figure 5A:
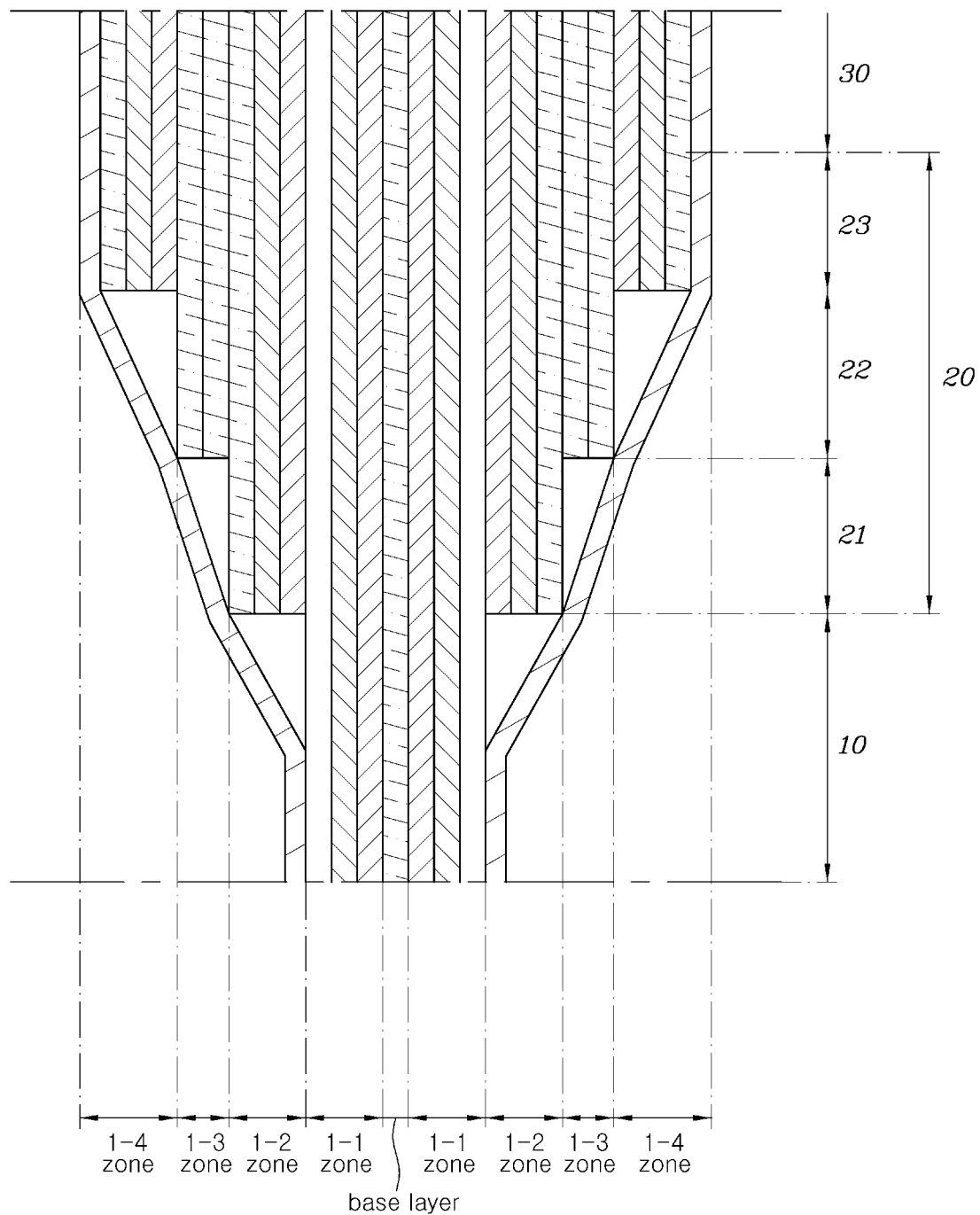
FIGS. 5A and 6A are cross-sectional views taken along the line A-A of FIG. 4 according to first and second exemplary embodiments, respectively.

FIG. 5 is a table listing types, orientations, and thicknesses of reinforced fibers for each region according to a first exemplary embodiment and illustrating an example in which the first exemplary embodiment is implemented. In the table of FIG. 5, GFRP in the table indicates GFRP formed into a plain weave fabric or a twill weave fabric in which glass fibers are woven at 0° and 90°, and orientations of 0, 15, and −15 in the table indicate CFRP in which carbon fibers are arranged at respective angles. Hereinafter, these conditions are also applied to FIGS. 6 to 7. According to the present invention, the center pillar may be formed such that the thickness thereof does not increase in the order of the bottom region 10, the first transition region 21, the second transition region 22, the third transition region 23, and the top region 30 and thus, the thickness and the pattern thereof may remain the same over the bottom region 10, the first transition region 21, the second transition region 22, the third transition region 23, and the top region 30.

Figure 6A:
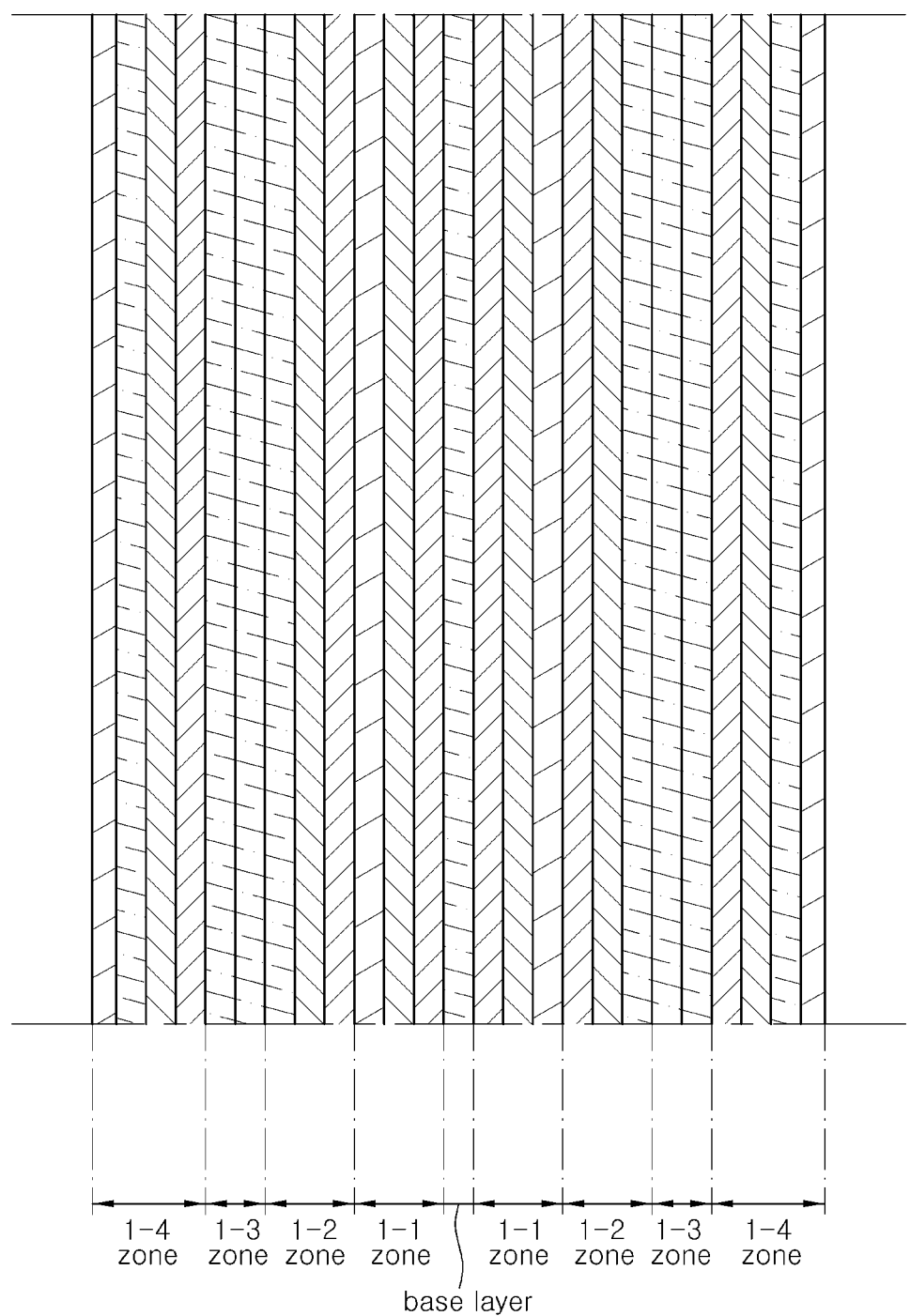

FIG. 6 is a table listing types, orientations, and thicknesses of reinforced fibers for each region according to a second exemplary embodiment and illustrating an example in which the second exemplary embodiment is implemented. Each center pillar according to the first and second embodiments described above may be configured such that GFRP having a non-conductive property is disposed at the outermost sides to prevent bimetallic corrosion on the center pillar. On the other hand, in the case of a center pillar applied to a vehicle which is not exposed to bimetallic corrosion, the arrangement of the CFRP and the GFRP is changed from the above exemplary embodiments to maximize strength.

The center pillar may be divided into a bottom region 10, a transition region 20, and a top region 30 with respect to the longitudinal direction from the bottom to the top. Particularly, the transition region 20 refers to a region including the first transition region 21, the second transition region 22, and the third transition region 23 described above. The bottom region 10 may be provided with a 2-1 zone in which GFRP formed into a plain weave fabric or a twill weave fabric in which glass fibers are woven at 0° and 90°, CFRP in which carbon fibers have an orientation of 0°, and GFRP formed into a plain weave fabric or a twill weave fabric in which glass fibers are woven at 0° and 90° are sequentially laminated on opposite surfaces of a base layer.

The transition region 20 may be provided with the 2-1 zone and a 2-2 zone in which CFRP in which carbon fibers have an orientation of ±15° are laminated on the 2-1 zone. Additionally, the top region 30 is provided with the 2-1 zone, the 2-2 zone, and a 2-3 zone in which CFRP in which carbon fibers have an orientation of ±15° are laminated on the 2-2 zone. The CFRP and the GFRP forming the 2-1 zone provided in the bottom region 10, the transition region 20, and the top region 30 may be extended over the regions. The CFRP and the GFRP forming the 2-2 zone provided in the transition region 20 and the top region 30 may be extended over the regions.

Figure 7A:
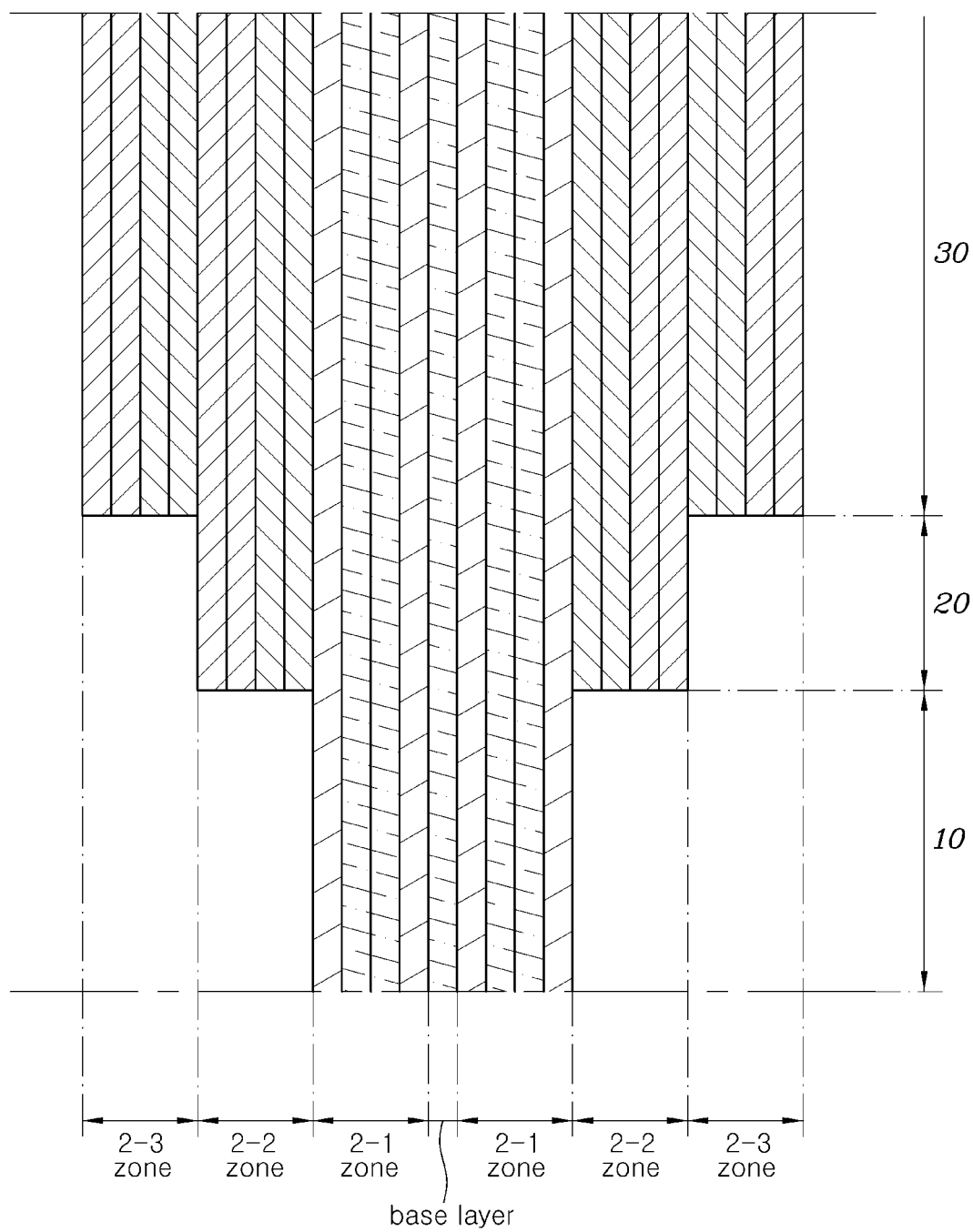
FIGS. 7A and 8A are cross-sectional views taken along the line A-A of FIG. 4 according to third and fourth exemplary embodiments, respectively.

Therefore, as illustrated in FIG. 7, the thickness of the center pillar may gradually increase in the order of the bottom region 10, the transition region 20, and the top region 30. FIG. 7 is a table listing types, orientations, and thicknesses of reinforced fibers for each region according to a third exemplary embodiment and illustrating an example in which the third exemplary embodiment is implemented. According to the present invention, the center pillar may be formed such that the thickness thereof does not increase in the order of the bottom region 10, the transition region 20, and the top region 30 and thus, the thickness and the pattern thereof may remain the same over the bottom region 10, the transition region 20, and the top region 30.

Figure 8A:
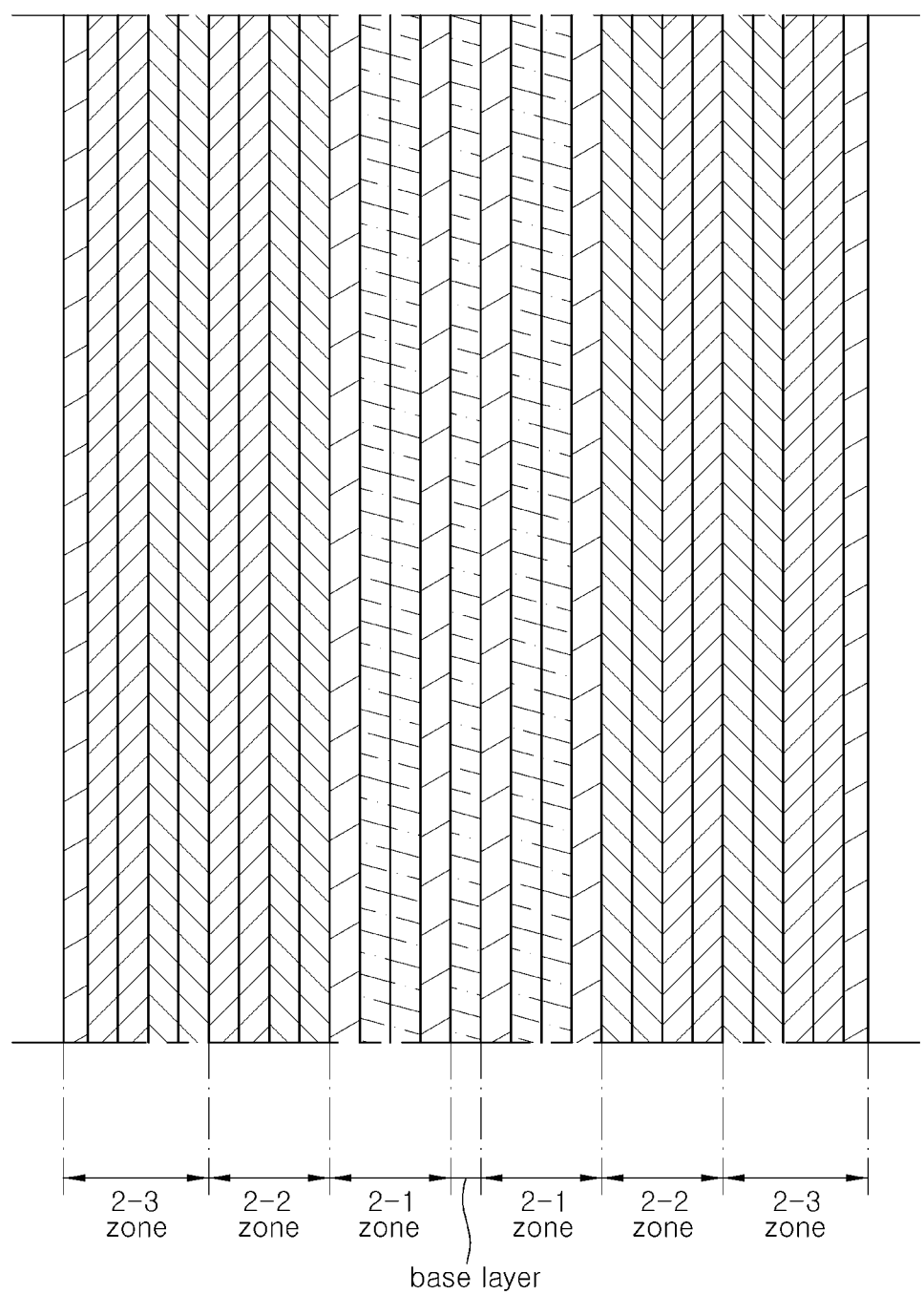

FIG. 8 is a table listing types, orientations, and thicknesses of reinforced fibers for each region according to a fourth exemplary embodiment and illustrating an example in which the fourth embodiment is implemented. An experiment was conducted to analyze side-collision impact resistance and roof strength of a center pillar made of a general steel material prepared using high-tensile-strength steel sheets in the related art and the center pillar prepared according to the first exemplary embodiment of the present invention. The results are shown in Table 1.

TABLE 1

| Category | Comparative Example (Center pillar made of steel material) | First Embodiment (Center pillar prepared by laminating composite material) |
|---|---|---|
| Side collision analysis - Maximum Y displacement [mm] | 159.7 (0.058 seconds) | 138.6 (0.070 seconds) |
| Roof strength analysis - Maximum reaction force [kN] | 88.0 | 89.9 |

As shown in Table 1, it was confirmed that the center pillar prepared by laminating the composite material according to the exemplary embodiment of the present invention has excellent side-collision crashworthiness and excellent roof strength compared with the center pillar made of the steel material in the related art.

Although the various exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A center pillar for a vehicle, comprising:
a base layer formed of carbon-fiber-reinforced plastic (CFRP); and
laminate layers in which a plurality of layers of CFRP and a plurality of layers of glass-fiber-reinforced plastic (GFRP) are alternately disposed on each of opposite first and second surfaces of the base layer individually,
wherein the CFRP and the GFRP laminated on the first surface of the base layer and the CFRP and the GFRP laminated on the second surface of the base layer are symmetrical to each other with respect to a thickness direction of the center pillar,
wherein the center pillar is divided into a bottom region, a first transition region, a second transition region, a third transition region, and a top region with respect to a longitudinal direction of the center pillar from a bottom to a top thereof,
wherein the bottom region is provided with a 1-1 zone in which CFRP having carbon fibers with an orientation of ±15° and GFRP formed into a plain weave fabric or a twill weave fabric with glass fibers woven at 0° and 90° are sequentially laminated on opposite surfaces of the base layer, wherein the first transition region is provided with the 1-1 zone and a 1-2 zone in which CFRP having carbon fibers with an orientation of ±15°, CFRP having carbon fibers with an orientation of 0°, and GFRP formed into a plain weave fabric or a twill weave fabric with glass fibers woven at 0° and 90° are sequentially laminated on the 1-1 zone, wherein the second transition region is provided with the 1-1 zone, the 1-2 zone, and a 1-3 zone in which CFRP having carbon fibers with an orientation of 0° and GFRP formed into a plain weave fabric or a twill weave fabric with glass fibers woven at 0° and 90° are sequentially laminated on the 1-2 zone, and wherein the third transition region and is provided with the 1-1 zone, the 1-2 zone, the 1-3 zone, and a 1-4 zone in which CFRP having carbon fibers with an orientation of ±15°, CFRP having carbon fibers with an orientation of 0°, and GFRP formed into a plain weave fabric or a twill weave fabric with glass fibers woven at 0° and 90° are sequentially laminated on the 1-3 zone.

2. The center pillar of claim 1, wherein the base layer is formed of CFRP in which carbon fibers have an orientation of 0° with respect to a longitudinal direction of the center pillar.

3. The center pillar of claim 1, wherein a plurality of layers of CFRP forming the laminate layers includes carbon fibers having an orientation of 0° or ±15° with respect to a longitudinal direction of the center pillar.

4. The center pillar of claim 1, wherein a plurality of layers of GFRP forming the laminate layers is a plain weave fabric or a twill weave fabric in which glass fibers are woven at 0° and 90° with respect to a longitudinal direction of the center pillar.

5. The center pillar of claim 1, wherein the center pillar is formed such that all of the 1-1 zone, the 1-2 zone, the 1-3 zone, and the 1-4 zone are provided on the bottom region, the first transition region, the second transition region, the third transition region, and the top region.

6. A center pillar for a vehicle, comprising:
a base layer formed of carbon-fiber-reinforced plastic (CFRP); and
laminate layers in which a plurality of layers of CFRP and a plurality of layers of glass-fiber-reinforced plastic (GFRP) are alternately disposed on each of opposite first and second surfaces of the base layer individually,
wherein the CFRP and the GFRP laminated on the first surface of the base layer and the CFRP and the GFRP laminated on the second surface of the base layer are symmetrical to each other with respect to a thickness direction of the center pillar,
wherein the center pillar is divided into a bottom region, a transition region, and a top region with respect to a longitudinal direction of the center pillar from a bottom to a top thereof,
wherein the bottom region is provided with a 2-1 zone in which GFRP formed into a plain weave fabric or a twill weave fabric having glass fibers woven at 0° and 90°, CFRP having carbon fibers with an orientation of 0°, and GFRP formed into a plain weave fabric or a twill weave fabric with glass fibers ae woven at 0° and 90° are sequentially laminated on opposite surfaces of the base layer,
wherein the transition region is provided with the 2-1 zone and a 2-2 zone in which CFRP having carbon fibers with an orientation of ±15° are laminated on the 2-1 zone, and
wherein the top region is provided with the 2-1 zone, the 2-2 zone, and a 2-3 zone in which CFRP having carbon fibers with an orientation of ±15° are laminated on the 2-2 zone.

7. The center pillar of claim 6, wherein the center pillar is formed such that all of the 2-1 zone, the 2-2 zone, and the 2-3 zone are provided on the bottom region, the transition region, and the top region.

8. The center pillar of claim 1, wherein the CFRP is about 0.16 mm thick, and the GFRP is about 0.5 mm thick.

* * * * *